(No Model.) 5 Sheets—Sheet 5.
L. E. WATERMAN.
CHECK ROW CORN PLANTER.
No. 603,584. Patented May 3, 1898.
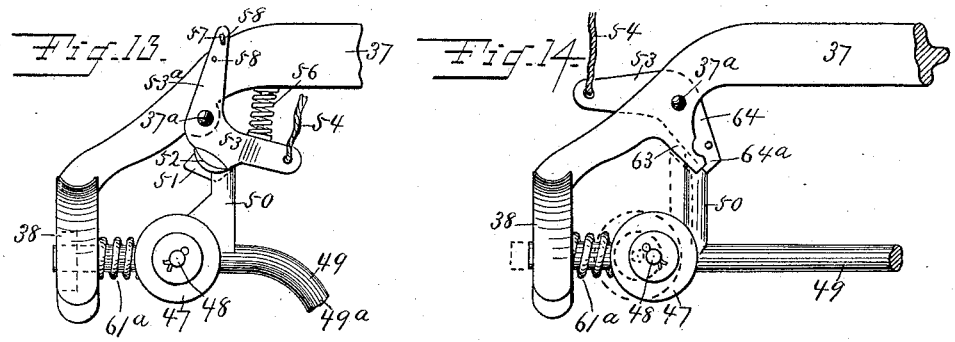
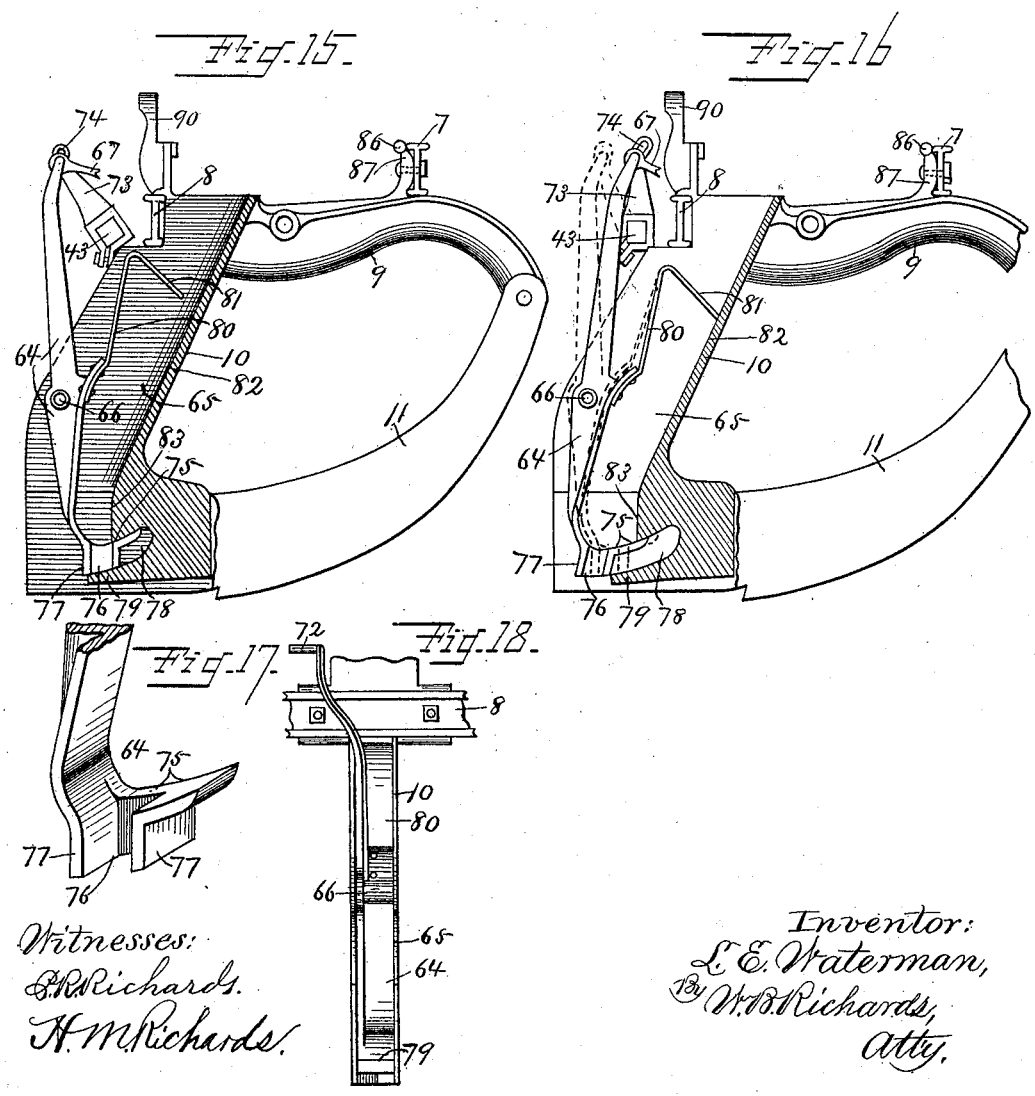
Witnesses:
G. R. Richards.
H. M. Richards.
Inventor:
L. E. Waterman,
By W. B. Richards,
Atty.

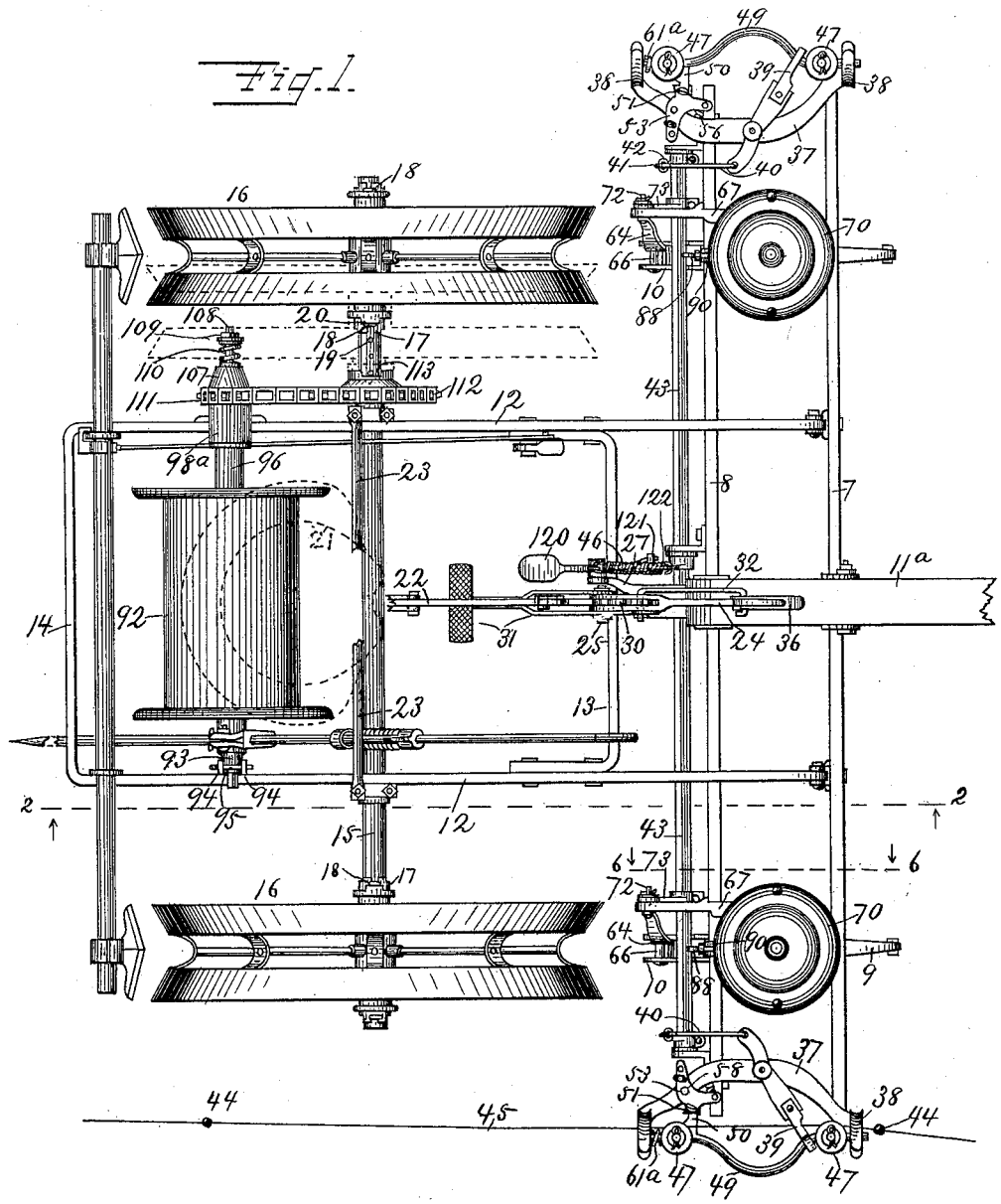

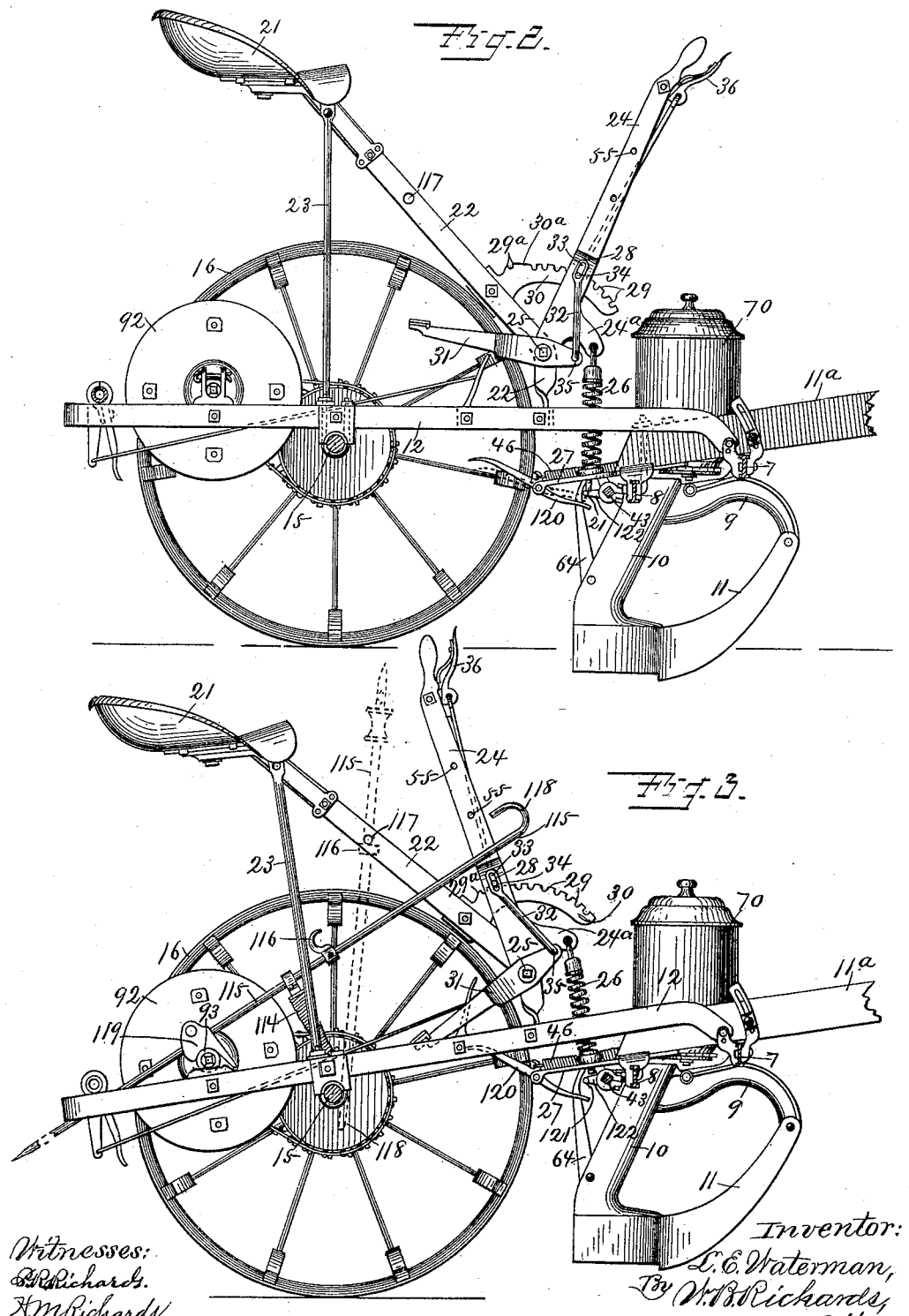

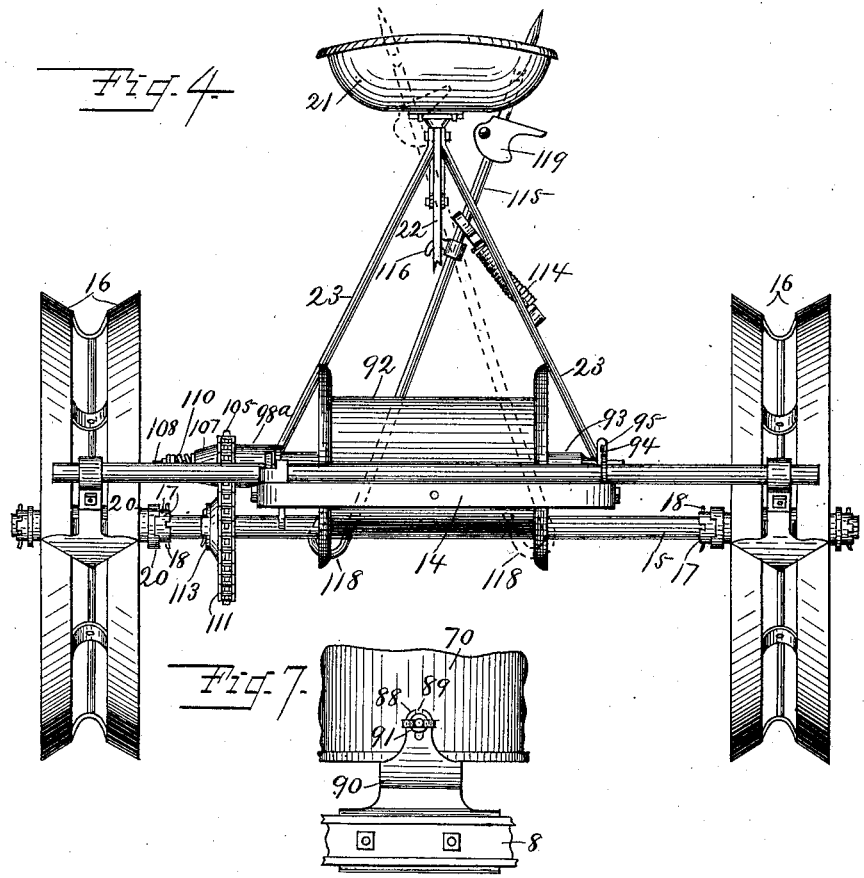

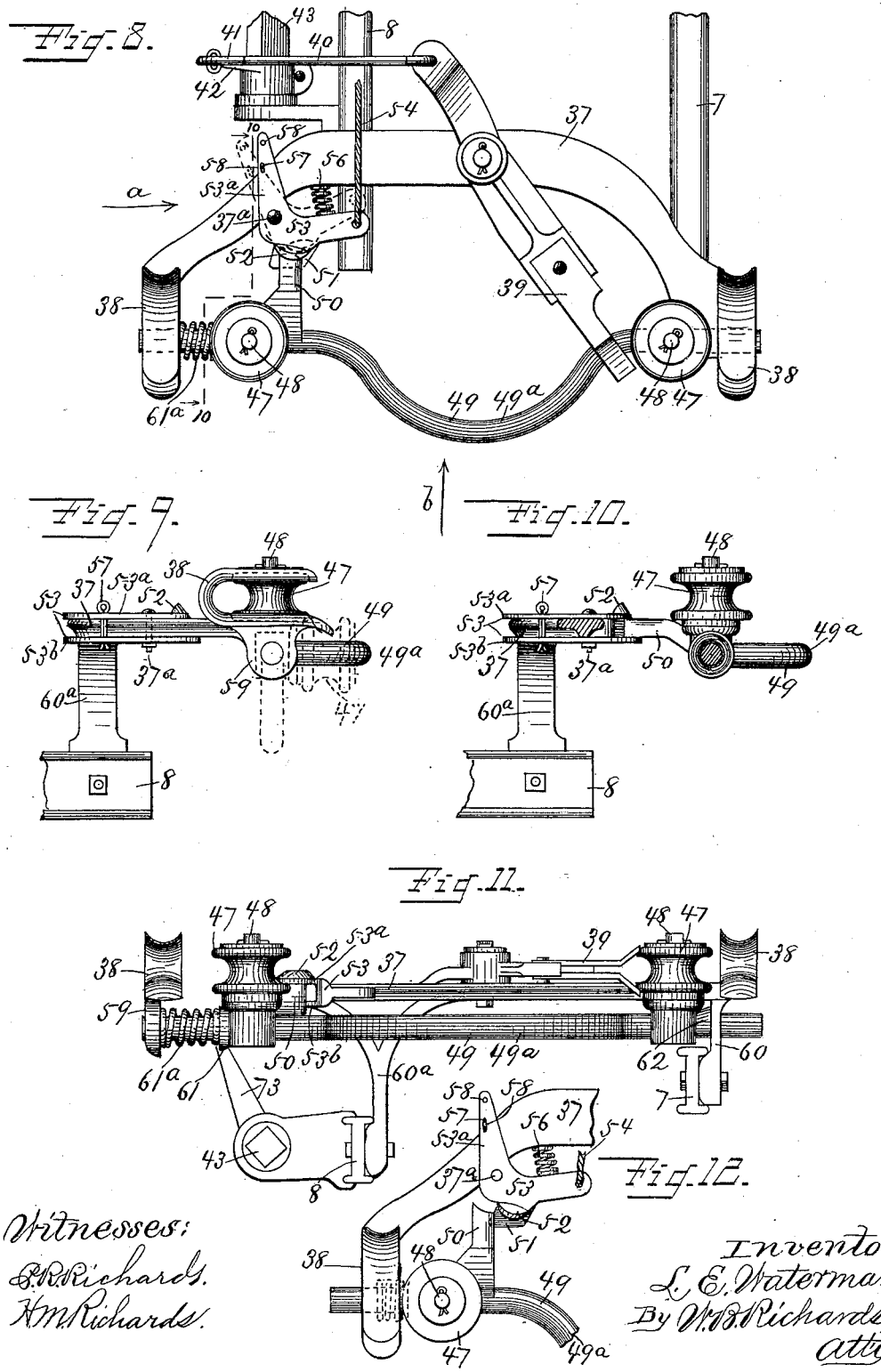

UNITED STATES PATENT OFFICE.

LEWIS E. WATERMAN, OF MOLINE, ILLINOIS, ASSIGNOR TO THE DEERE & MANSUR COMPANY, OF SAME PLACE.

CHECK-ROW CORN-PLANTER.

SPECIFICATION forming part of Letters Patent No. 603,584, dated May 3, 1898.

Application filed November 20, 1897. Serial No. 659,263. (No model.)

*To all whom it may concern:*

Be it known that I, LEWIS E. WATERMAN, a citizen of the United States, residing at Moline, in the county of Rock Island and State of Illinois, have invented certain new and useful Improvements in Check-Row Corn-Planters, of which the following is a specification.

My present invention relates to improvements in check-row corn-planters.

The object of the first part of my invention is to provide a combined hand and foot lever for raising and lowering the forward frame and seeding mechanism, such that the foot-lever can be used to trip or release the locking dog or detent carried by the hand-lever and to operate the hand-lever, which is connected with the forward frame, to raise and lower it.

A further object is to provide improvements in the manner of mounting on the check-row head or planter the guide-pulleys which hold the check-row line in contact with the forked levers, such as to furnish an improved tilting check-row-line doffer when operated by the driver and such as to furnish an automatic doffer when actuated by extra lateral strain imposed on the check-row line.

A further object is to provide improved intermediate valves or valves located in the seed-tubes between the seedbox-valves and the lower or discharging valves and to provide an improved seed tube or duct and shelf at its lower end.

A further object is to provide improved means of mounting the reel on the planter-frame, whereby it is readily and easily removable therefrom, to provide improved and adjustable frictional gear between the reel and its driving mechanism, whereby the check-row line may be properly laid over rough, uneven, and other kinds of soil, and to provide improved means of rotating the reel.

A further object is to provide an improved combined anchor for the check-row line, reel-brake, and guide for reeling the check-row line on the reel.

A further object is to connect the radial arm on the rock-shaft, the stem of the seed-tube valve, and the reciprocating pawl for actuating the seed-cup wheels in such manner that said pawl will reciprocate substantially in a direct line.

To accomplish these different objects and other objects hereinafter described, my invention consists in constructions and combinations hereinafter described and made the subject-matter of claims herewith.

Referring to the accompanying drawings, Figure 1 is a top plan of a planter embodying my improvements; Fig. 2, a sectional elevation in the line 2 2 in Fig. 1 and side elevation of other parts, showing the parts in same relative positions as at Fig. 1 with the forward frame lowered for planting; Fig. 3, same elevation as Fig. 2, but showing the forward frame raised for local transportation and, further, showing the combined anchor, reel-brake, and guide mounted on the machine; Fig. 4, a rear elevation of parts of the rear frame of the planter hereinafter described; Fig. 5, an enlarged vertical central sectional elevation showing the friction-gear and rear side elevation of one end of the reel; Fig. 6, an enlarged sectional elevation in the line 6 6 in Fig. 1; Fig. 7, an enlarged rear elevation of part of the seedbox and other adjacent parts; Fig. 8, an enlarged top plan of the check-row head on the right-hand side of the machine, forked lever, the check-row-line doffer and its trip engaged, and other adjacent parts and fragments of parts; Fig. 9, an elevation of parts of Fig. 8, seen from the rear, or in the direction indicated by the arrow *a* at Fig. 8; Fig. 10, a sectional elevation in the line 10 10 in Fig. 8; Fig. 11, an elevation of parts shown at Fig. 8, seen from the side, or in the direction indicated by the arrow *b* at Fig. 8; Fig. 12, a top plan of part of Fig. 8, showing the doffer-trip in its released position; Fig. 13, a top plan of parts shown at Fig. 8, but differently adjusted therefrom; Fig. 14, a mechanical modification of the doffer shown at Fig. 8; Fig. 15, an enlarged central sectional elevation of the seed-tube standard and side elevation of the lower valve or discharge-valve, the intermediate valve, and other parts; Fig. 16, a sectional and side elevation same as Fig. 15, but showing the valves in different positions relatively to the seed-tube from that shown at said figure; Fig. 17, an enlarged perspective of the lower end part of the lower or discharge valve; Fig. 18, a rear elevation of the seed-tube standard and adjacent parts.

My improvements may be incorporated in planters of any ordinary construction. In the drawings they are shown as incorporated in an ordinary planter having a forward frame comprising transverse bars 7 and 8 and side frame-bars 9, seed-tube standards 10, runners 11, and an adjustable tongue 11ª, and a rear frame comprising side frame-bars 12, hinged at their forward ends to a lug which is fixed to the bar 7, and transverse bars 13 and 14. The rear frame is rigidly connected with the axle 15, and is supported on the axle and the split wheels 16, which wheels are of ordinary construction except that one of them is adjustable lengthwise of the axle, where it is held by the collars 17 and pins 18, which pass through either of a series of holes 19 in the axle, and the inner end of the hub of this wheel has projecting lugs 20, which constitute one member of a clutch hereinafter described. A driver's seat 21 is supported on the rear frame by ordinary bars 22 23.

The lower end of the hand-lever 24 spans the bar 22 and is pivotally connected therewith by a bolt 25. A lug or arm 24ª, projecting forwardly from near the lower end of the hand-lever, is connected by a spring 26, in an ordinary manner, with an arm 27, which projects rearwardly from the rear end of the tongue 11ª. The hand-lever 24 carries an ordinary spring-actuated dog or detent 28, which engages with the teeth 29 29ª in a curved rack-bar 30, fixed to the bar 22 to lock and hold the forward frame with the runners at desired depths in the soil or entirely above the ground in the usual manner. The foot-lever 31 spans the hand-lever and the bar 22, and is also pivotally connected with the bar 22 by the bolt 25.

A link 32, pivotally connected at its lower end with the forward end of the foot-lever 31, has a slot 33 in its upper end part, through which a stud or pin 34 extends, which stud projects from the dog 28 through a slot (not shown) in the hand-lever 24. The lower end of the link 32, where it is pivotally connected with the foot-lever, extends through the foot-lever and forms a stud or pin 35, which extends across and beneath the lug or arm 24ª and at such short distance below said arm that when the driver by pressure with his foot on the rear end of the foot-lever 31 raises the link 32, so that the lower end of the slot 33 will trip or raise the dog 28 out of engagement with the teeth of the rack-bar, the same movement of the foot-lever will raise the stud 35 into engagement with the lug or arm 24ª. The slot 33 is of such length as to permit of operating the dog 28 by the thumb-lever 36 in the usual manner, so that the hand-lever may be used regardless of the foot-lever to rock or tilt the rear frame and raise and lower the forward frame in the ordinary manner. The slot 33 is, further, of such length that the heavier rear end of the foot-lever 31 will raise the forward end of the foot-lever and retain said slot 33 with its lower end against the stud 34 and in position to raise the dog 28, as above described, while the dog 28 is held engaged with the teeth 29 29ª by the thumb-lever 36 and its spring, as shown at Fig. 2. While the hand and foot levers are in the last-described positions, and especially when the hand-lever is adjusted to its farthest forward and lowest positions, as in planting seed, and when the planter is approaching the ends of rows and the driver's hands are engaged with the draft-animals and other work, then without taking hold of the hand-lever and by pressure of his foot on the pedal of the foot-lever 31 he can trip the dog 28, release the hand-lever, and force it rearwardly by the foot-lever 31 alone to raise the forward frame entirely above the surface of the soil for the ordinary purposes, and where it will be held by the dog 28 engaging with the rear teeth 29ª of the rack-bar until released by operating the thumb-lever 36. By these means, when desired, the foot-lever, while to a certain extent independent of the hand-lever, may be used to assist the driver in raising the forward frame by the use of his hand and the hand-lever.

When the hand-lever has been swung rearward to about the position shown at Fig. 3, the dog 28 will be held in its higher position by the toothless section 30ª of the rack-bar 30, and the foot-lever or hand-lever can then be used to force the hand-lever backwardly until the dog 28 engages with the teeth 29ª.

A curved check-row head 37, mounted, as usual, on the extended ends of the frame-bars 7 and 8 at each side of the planter, has ordinary check-row-line guides 38 at its ends and an ordinary forked lever 39 pivotally connected therewith. The inner ends of the levers 39 are each pivotally connected with one end of a link 40, the other ends of which links are each formed into an elongated eye 41, which eyes are pivotally connected, one with the outer end of each radius-arm 42, projecting from the rock-shaft 43. One of the forked levers 39, coming successionally into contact with the tappets 44 on the check-row line 45, will rock or turn the rock-shaft in one direction and the spring 46 will rock it in an opposite direction, all in an ordinary manner.

Ordinary guide-pulleys 47 are rotatably mounted on standards 48, which project upwardly from a bar 49, which is journaled in the ends of the check-row head 37, so that it can be tilted or turned down, as shown by dot-lines at Fig. 9, to doff or permit the discharge of the check-row line therefrom. The tilting bar 49 is held in its normal position by an arm 50, which projects therefrom and rests at its distal end on a lug 51, hereinafter described, where it is held by the heel 52 of a detent or lever 53, which is of bent form or elbow-shaped, its main part split into two parts 53ª and 53ᵇ to span the check-row head, and is pivoted near its bend to the check-row head by a bolt 37ª. One end or arm of the detent 53 is connected by a cord 54 with the similar arm of a detent at the other side of the planter. The line 54 may be passed through the hole 55 in the hand-lever 24 or otherwise brought within reach of the driver. A thrust-spring 56, pressing against one arm of the detent 53, holds it in the position shown by full lines at Fig. 8, aided by a stop-pin 57, seated in the inner hole 58 in the upper and lower parts of the other arm of the detent, being in contact with one side of the check-row head. While in this position, a pull on the line 54 will turn the detent 53 into the position shown by dot-lines at same figure, and thus draw its heel from over the arm 50 to release it, when the side draft of the check-row line will tilt or turn the tilting bar and pulleys 47 down, and thereby doff the check-row line, as hereinbefore described. The outwardly-curved central part 49ª of the tilting bar 49 (see Fig. 8) will serve as a crank-arm in aiding the operator to restore said tilting bar to its normal position by turning it upwardly, when the arm 50 will come in contact with the upper beveled or cam-shaped side of the heel 52, which heel projects from the upper part 53ª and is to one side of the pivotal point of the detent and, acting thereon, will force the detent back toward its dot-line position, Fig. 8, to permit the arm 50 to pass it, when the spring 56 will again restore the detent to its position above the arm 50, which is held between the detent and the lug 51, which projects from the side part 53ᵇ of the detent.

The bar 49 is pivotally mounted in standards 59 60, one of which, 59, is simply a pendent lug from the check-row head, and the other of which, 60, is also a pendent lug from the check-row head and also connects the adjacent end of said head with the frame-bar 7; the other end of said head being connected with the frame-bar 8 by a standard 60ª. The rear end part of the bar 49 between the pendant 59 and a collar 61 on said bar is encircled by a helical thrust-spring 61ª, which holds the bar 49 in its normal position, with a stop-collar 62 thereon resting against the standard 60.

While the parts are in the relative positions shown at Figs. 8 and 11, should extra strain come upon the check-row line laterally and rearwardly of the planter with liability to break said line then such strain acting on the forward pulley 47 will force the bar 49 rearwardly, and thus move the bar 50 from beneath the heel 52, so that the same lateral strain on the check-row line will tilt the bar 49, and thus automatically doff said line. Such extra strain frequently arises when from any cause the planter is driven too near the end of the row before operating the doffer when the check-row line is caught by rough ground, stumps, roots, or other things well out in the field and which prevent its being dragged laterally into line with the planter as it traverses the field and when a tappet on said line contacts with the rear guide-pulley and may arise in other ways. When the stop-pin 57 is in the outer hole 58, as shown at Fig. 13, then the detent can be operated, as already described, to doff the check-row line, but the bar 49, while it can yield endwise far enough to release a caught tappet, cannot yield endwise far enough to release the arm 50 from the heel 52 to allow the bar 49 to tilt. Hence this adjustment is useful in cloddy rough soil or where cornstalk-roots are numerous, which would frequently doff the line, with the pin 57 in the inner hole 58, but which do not offer resistance sufficient to break it. This result may also be effected in a less efficient manner, however, by means for adjusting the tension of the spring 61ª to offer a greater or less resistance to the movement endwise of the bar 49.

In the modification shown at Fig. 14 the arm 50 in its normal position rests beneath an arm 63, which projects from the check-row head 37, so that a pull on the cord 54 will swing the lever 64, which is below the arm or detent 63, and its end 64ª will contact with the arm 50 and can be used to force it from the detent or arm 63, and thus release it, so that the bar 49 can tilt to doff the wire. In this modification the arm 50 will be released from the arm 63 when extra strain comes upon the check-row line by the bar 49 sliding rearwardly, as indicated by the dot-lines, and thus doff said line, as hereinbefore described.

The valve 64 in the seed tube or duct 65 in the standard 10 (see Figs. 15 to 18) is pivotally mounted on a bolt 66, with its upper extended end pivotally connected with the outer end of a pawl 67, which intermittently actuates the seed-cup plates or valves 68 by acting on the lugs 69 in an ordinary manner. The pawl 67 is guided in place by said lugs by the lower tapered side of the seedbox 70 and by a pendent lug 71. A stud or pin 72, which projects laterally from the upper end of the valve 64, (see Fig. 18,) forms the pivotal connection between said valve, the pawl 67, and the radius-arm 73, which projects from the rock-shaft 43. The pin 72 passes through a slot 74 in said radius-arm, which permits the pawl to reciprocate endwise of itself with substantially no rising-and-falling movement of its pivoted end, and hence with improved action.

The lower end of the valve 64 is curved forward to form a plate 75, which inclines upwardly toward its outer end, so that seed alighting thereon will slide downwardly into a short three-sided bottomless pocket 76 in a short projection 77, which extends below the plate 75. When the lower end of the valve 64 is swung inwardly, the end of the plate 75 enters the recess 78 in the seed-tube standard, and the pocket 76 is brought into position over the shelf 79, where it will then retain seed, and when swung outwardly will not only tend to throw the charge of seed rearwardly with a velocity proportioned to the rate of speed of the planter, but will also tend to throw it downwardly by reason of the downward and rearward slope or incline of the shelf 79, and thus hasten its travel to the place of deposit in the furrow, and thereby further improve the uniformity of the distance between the deposits of seed.

The valve 64 fits snugly laterally of the seed-duct 65 (see Fig. 18) to form a rear wall for said duct. The intermediate valve, located between the pocket or valve 76 and the valve in the seedbox, is formed of one end, 81, of a spring-plate, the other end, 80, of which forms a spring-plate and is riveted or otherwise secured to the valve 64, so as to be actuated thereby and therewith. The valve 81 inclines downwardly from its rear to its front end. At Fig. 16 the valve 64 is shown by full lines as swung to the limit of its throw to remove the pocket 76 or valve proper from the shelf 79, and thereby discharge seed contained therein. While the valve 64 is in the position last described the valve 81 is forced into contact with the inclined wall 82 or front side of the seed-duct 65 with such force as to bend the part 80 thereof to such an extent that in swinging the valve 64 in the opposite direction to that last described it will move into the position shown by dot-lines at same figure before the valve 81 begins to move away from said wall, and thus will delay the movement of the valve 81 and prevent its opening to discharge seed which it has received from the valve in the seedbox until the valve or pocket 76 has so nearly reached its position completely over the shelf 79, as shown by dot-lines at same figure, that the seed delivered from the valve 81 cannot—even any portion—reach the valve or pocket 76 before it is over the shelf 79 and closed, as shown at Fig. 15, where the valve 64 has completed its throw and is closed while the valve 81 is fully open. The valve 81 will come into contact with the front wall of the seed-duct before the valve 64 has completed its throw outwardly at its lower end, and hence will be closed when the valve or pocket 76 has been only partially removed from over the shelf 79.

The recess 78 is in the short vertical lower end part 83 of the forward wall of the seed-duct 65, which vertical part of said wall is at the lower end of the long inclined part 82, and by permitting the plate 75 to enter said recess the shelf 79 can be, as shown, shortened, so that when the valve 64, with the valve 81, is removed for use of the planter as a drill the seed will acquire such direction of movement, as well as velocity in passing down the inclined part 82 of the seed-duct wall, as will deposit it without contact with said shelf, which otherwise would catch much of it temporarily and cause irregular spacing of the deposits of seed in drilling.

The seedboxes 70 are each removably held in place by curved lugs 85, which project rearwardly from its lower part at one side of said box and which pass beneath trunnions 86, one of which projects from each side of a standard 87, which is bolted to the frame-bar 7, (see Figs. 6, 15, and 16,) and a bolt 88, which is fixed to and projects from the other side of said box and seats in an opened end slot 89, Fig. 7, in a standard 90, which is fixed to the frame-bar 8. The outer end of the bolt 88 is screw-threaded, and a wing-nut 91 fixes it to said standard. By loosening the nut 91 the seedbox can be tilted to raise the bolt 88 out of the slot 89, and when the box is in a tilted position the curved lugs 85 can be withdrawn from beneath the trunnions 86 by removal of the seedbox. The boxes are reseated by a reverse operation to that described. By these simple means the seedboxes may be quickly and easily removed for access to the lower parts thereof, for inverting them to clear them of objectionable matter or of seed, for carrying them short distances to a seed-supply, where they can be replenished with seed, and for other purposes. One end of the reel 92 for the check-row line has a journal 93 projecting therefrom, which is journaled between two jaws 94 and held therein by a pin or bolt 95. (See Fig. 1.) The other end of said reel has a shaft projecting therefrom, the outer end 96 of which is square in its cross-section and seats in a corresponding socket 97 in a head 98. The head 98 has an annular flange 99 on its inner end, a cylindrical part or journal 100, a tapered subconical part 101, a square outer end part 102, and a bore or hole 103, which is smaller than the socket 97, so as to form a shoulder 104. A sprocket-wheel 105 with a conical-shaped hub 106 fits over and in frictional contact with the cone 101 and loosely over the end 102 of the head 98 in such manner that it can rotate on the end 102 while it rotates the head 98 by frictional contact therewith. A cup-shaped cone or washer 107 fits over the cone-shaped hub 106 and also over the end 102 of the head 98, which end is square in its cross-section, so that the cone or washer 107 will rotate therewith. A bolt 108 is seated in the hole 103, with its head against the shoulder 104, and has a nut 109 on its outer screw-threaded end, between which nut and the cup-shaped cone or washer 107 a helical spring 110 encircles said bolt. The head 98 is journaled in a bearing 98ª, which is fixed to the frame-bar 12.

A sprocket-chain 111 gears the sprocket-wheel 105 with a sprocket-wheel 112, loosely mounted on the planter-axle 15. The hub of the sprocket-wheel 112 has recesses 113, which receive the projections 20 on the hub of the adjacent planter-wheel 16 when said planter-wheel is adjusted on the axle, as indicated by dot-lines at Fig. 1, and thus forms the other member of a clutch hereinbefore referred to. After such adjustment of the planter-wheel it is again held in place on the axle by the pin 18, so that the planter-wheels will rotate the sprocket-wheel 112, and thereby rotate the reel 92 for taking up the check-row line in the common way. While thus taking up said line, the tension may be regulated by adjustments of the nut 109 on the bolt 108 to increase or diminish the friction, as may be required for such purpose, between the cone-shaped surface 101 and the hub of the sprocket-wheel 105 and between said hub and the cup-shaped cone 107. By removal of the pin or bolt 95 that end of the reel may be lifted from the jaws 94 and then the reel removed from the planter by withdrawal of the shaft 96 from its seat in the socket 97 in the head 98 in an evident manner. The reel is again seated by a reverse operation. By these means the reel may be removed from the planter without removing or disturbing the head 98, which forms the journal for the reel in the bearing 98ª, and also without removing the sprocket-wheel 105 and its hub 106 or removing any of the adjacent parts.

In laying the check-row line before commencing to plant seed the wheel 16 is adjusted to its full-line position out of gear with the sprocket-wheel 112, and the check-row line wound on the reel is then attached with its free end to the spring 114, which is carried, as usual, by the ordinary anchor 115, which is provided with a foot-piece to aid in inserting it in the ground at the ends of the rows, as usual.

The anchor 115 has a hook 116 secured thereto, which can be inserted in a hole 117 in the seat-supporting bar 22 to pivotally connect said anchor therewith in an inverted position, as shown at Fig. 4. The driver can now by his hand grasping the upper end of the anchor swing it laterally of the planter to properly guide the check-row line as it is wound on the reel in taking it up, as hereinbefore described, the check-row line passing through the hook 118 on one end of the anchor for that purpose. There are two anchors used in planting, one at each end of the check-row line, as usual. The two anchors are alike. In laying out the check-row line from the reel to begin planting one end of said line is attached to the spring of one of the anchors staked in the ground at one side of the field. The other anchor is then used as a friction-brake on the reel-journal 93 by placing one end of said anchor beneath the rear frame-bar 14 and its other end within easy reach of the driver, with its brake-shoe 119, which is fixed to the mid-length part of the anchor, resting with its concave side on said journal, as shown at Fig. 3, whereby the proper tension of the wire may be secured in laying it.

By means of a foot-lever 120, pivotally mounted on the rear end of the arm 27 and acting on a lug 121, projecting laterally from a radius-arm 122, which extends rearwardly from the rock-shaft 43, the driver with his foot may in an evident manner rock the shaft 43, and thus operate the seeding mechanism in planting short rows or whenever desirable to do so.

Although I have specifically described the construction and relative arrangement of the several elements of my improvements, yet I do not desire to be confined to such specific constructions, as such changes or modifications may be made as fairly fall within the scope of my invention.

Having thus described my invention, I claim as new—

1. In a planter the combination with a rear frame supported on wheels, and a forward frame having runners or furrow-openers and seeding mechanism, of a hand-lever pivotally mounted on said rear frame, connected with the forward frame, and provided with a locking-dog, a rack-bar with which said dog engages, a foot-lever pivotally mounted on said rear frame, a link connected at one end with one end of said lever and its other end adapted to disengage said dog from the rack-bar, substantially as described.

2. In a planter, the combination with a rear frame mounted on wheels, and a forward frame having furrow-openers or runners and seeding mechanism, of a hand-lever mounted on said rear frame and connected with the forward frame, a spring-actuated locking-dog carried by said hand-lever, a rack-bar, a foot-lever pivotally mounted on said rear frame, a link connected at one end with one end of said foot-lever, and its other end adapted to engage with said dog to disengage it from the rack-bar, and a projection laterally from said foot-lever, which projection engages with the hand-lever when the foot-lever is operated, and is removed therefrom by said spring which actuates the dog, substantially as described.

3. In a planter, the combination with a rear frame mounted on wheels, and a forward frame having runners or furrow-openers, and seeding mechanism, of a hand-lever mounted on said rear frame and connected with the forward frame, a spring-actuated locking-dog carried by said hand-lever and having a laterally-projecting pin or lug, a rack-bar, a foot-lever mounted on said rear frame, a link connected at one end with one end of said foot-lever and its other end having a slot which engages with said pin or lug, and a pin or lug projecting laterally from one end of said foot-lever, adapted for engagement with the hand-lever, substantially as described.

4. In a check-row planter, and in combination, a check-row head, a forked lever mounted on said head, a tilting bar hinged or journaled to said head, carrying guide-pulleys and a projecting arm, a spring-actuated detent-lever pivotally mounted on said head and adapted for engagement with the upper side of said arm, and another for engagement with its lower side, and a stop-pin, for said detent-lever, and a check-row line, substantially as described.

5. In a check-row planter, and in combination, a check-row head, a forked lever, a tilting bar carrying guide-pulleys and a projecting arm, a spring-actuated detent having a lug for engagement with the upper side of said arm, a stop-pin, and a check-row line, substantially as described.

6. In a check-row planter, and in combination, a check-row head, a forked lever, a tilting bar carrying guide-pulleys and a projecting arm, a spring-actuated detent having a lug for engagement with the upper side of said arm, and a series of holes for a stop-pin, a stop-pin, and a check-row line, substantially as described.

7. In a check-row planter, and in combination, a check-row head, a forked lever, a tilting bar carrying guide-pulleys and a projecting arm, a stop to limit the movement of said tilting bar when it is turned up into position for operation, a spring-actuated detent having a lug, with a cam-shaped or inclined upper side, for engagement with the upper side of said arm, a stop-pin, and a check-row line, substantially as described.

8. In a check-row planter, and in combination, a check-row head, a forked lever, a tilting bar carrying guide-pulleys loosely mounted on said head, whereby it may yield rearwardly and return forwardly, substantially as described.

9. In a check-row planter, and in combination, a check-row head, a forked lever, a tilting bar carrying guide-pulleys loosely mounted on said head, whereby it may yield rearwardly and return forwardly, a spring for imparting such forward movement thereto, and a check-row line, substantially as described.

10. In a check-row planter, and in combination, a check-row head, a forked lever, a tilting bar carrying guide-pulleys, mounted on said head to yield rearwardly and return forwardly, a spring for imparting the forward or return movement to said tilting bar, a check-row line, and means for limiting the forward and backward movements of said tilting bar, substantially as described.

11. In a check-row planter, and in combination, a check-row head, a detent mounted on said head, a forked lever, a tilting bar carrying guide-pulleys and a lateral arm projecting therefrom for engagement with said detent, said tilting bar mounted on the check-row head to yield rearwardly and return forwardly, a spring for imparting the forward or return movement to said tilting bar, and a check-row line, substantially as described.

12. In a check-row planter, and in combination, a check-row head, a forked lever, a spring-actuated detent pivotally mounted on said head and provided with a stop-pin hole, a stop-pin, a tilting bar carrying guide-pulleys and a lateral arm projecting therefrom for engagement with said detent, said tilting bar mounted on the check-row head to yield rearwardly and return forwardly, a spring for imparting the forward or return movements to said tilting bar, stops for limiting the forward and return movements of said tilting bar, and a check-row line, substantially as described.

13. In a planter, and in combination with a valve in the seedbox, a seed tube or duct, a discharging-valve pivotally mounted in the seed-tube with its lower seed-discharging end or valve proper near the lower end of said tube and its upper end near the upper end thereof, and an intermediate valve, fixed at one end to the discharge-valve, and its other end bent to form the intermediate valve proper, which is spring-yielding to delay its opening, substantially as described.

14. In a planter, and in combination with a valve in the seedbox, a seed tube or duct having a front wall with a longer inclined upper part and a substantially vertical lower part, a recess in said lower part, a shelf beneath said recess, a seed-discharging valve having a projecting plate which enters said recess, and a seed-cup which seats over said shelf as a bottom therefor, and an intermediate valve fixed to said discharge-valve, which intermediate valve is spring-yielding to delay its opening, substantially as described.

15. In a planter, and in combination with a valve in the seedbox, and a removable seed-discharging valve, a seed tube or duct having a front wall with a substantially vertical part at its lower end, a shelf at the lower end of said vertical part adapted to retain the seed in said valve, and having a long inclined upper part whereby the seed will be discharged free of said shelf when the seed-discharging valve is removed, substantially as described.

16. In a check-row planter, and in combination with a planter-frame, an axle, supporting-wheels, a reel, a bifurcated open bearing for one journal of said reel, means for securing the journal in said bearing, and a rotatable head in which said other journal of the reel is removably seated, substantially as described.

17. In a check-row planter, and in combination, substantially as described, a planter-frame, axle, supporting-wheels, a reel, a journal fixed to one end of said reel, a bearing for said journal, a bearing mounted on said frame, a head journaled in said bearing, and a shaft projecting from the other end of said reel, removably seated in said head, said shaft and head of such form that the shaft and reel will be rotated with the head, while the shaft may be withdrawn endwise from the head.

18. In a check-row corn-planter, and in combination with a planter-frame, an axle, and supporting-wheels, one of which wheels is adjustable on the axle, a sprocket-wheel loosely mounted on the axle to gear by a clutch with said adjustable wheel, a reel, a bearing for one journal thereof, a head journaled to the frame, a shaft fixed to the reel and removably seated in said head, a sprocket-wheel with a cone-shaped hub, a cup-shaped cone, a spring, a threaded bolt, a nut, and a sprocket-chain, all constructed and arranged to operate substantially as and for the purpose specified.

19. In a check-row planter, and in combination, a frame, supporting-wheels, a reel journaled in bearings on said frame, a driver's seat, supporting-bars for said seat, an anchor for the check-row line, having a bent end for a guide for said line in reeling it, and a hook fixed to the anchor for pivotally engaging it with the support, substantially as described.

20. In a check-row planter, and in combination, a frame, supporting-wheels, a reel journaled in bearings on said frame, an anchor for the check-row line, a brake-shoe fixed to said anchor, whereby the anchor may be used as a brake for the reel, substantially as described.

21. In a check-row planter, and in combination, a seedbox, rotatable seed-cup plates or disks mounted in said box, a rock-shaft, a seed-tube standard with seed duct or channel, a pawl for actuating said seed-cup plates, a seed-discharging valve pivotally mounted in said duct or channel, and its upper end pivotally connected with said pawl, and a radius-arm projecting from the rock-shaft, said radius-arm having a slot in its outer end through which a pin projects from the upper end of said seed-discharging valve, substantially as described.

22. A combined anchor for planter check-row lines, comprising an anchor for said lines, a reel-brake, and a guide for the check-row line in reeling it or taking it up by the planter, substantially as described.

23. A combination comprising a locking hand-lever, and a foot-lever pivoted to move independently of said hand-lever, and means interposed between said levers, whereby the hand-lever may be locked, unlocked, and adjusted by the foot-lever alone, substantially as described.

24. In a check-row planter, and in combination, substantially as described, a planter-frame, a reel, a journal fixed to one end of said reel, a bearing for said journal, a bearing mounted on said frame, a head journaled in said bearing and having a tapered outer end, a shaft projecting from the other end of said reel and removably seated in said head, a sprocket-wheel journaled on the tapering end of said head, a bolt connected with said head, a cup-shaped washer, a spring coiled on and a nut screw-threaded onto said bolt, whereby the washer, cup-shaped cone and head may be held in such frictional contact, as desired.

In testimony whereof I affix my signature in presence of two witnesses.

LEWIS E. WATERMAN.

Witnesses:
OSCAR F. LUNDAHL,
BAILEY W. AVERY.